(12) United States Patent
Albou (10) Patent No.: US 10,150,406 B2
(45) Date of Patent: Dec. 11, 2018

(54) LIGHTING AND/OR SIGNALING DEVICE WITH SCROLLING EFFECT

(71) Applicant: VALEO VISION, Bobigny (FR)

(72) Inventor: Pierre Albou, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/641,863

(22) Filed: Jul. 5, 2017

(65) Prior Publication Data

US 2018/0009371 A1    Jan. 11, 2018

(30) Foreign Application Priority Data

Jul. 5, 2016 (FR) ...................... 16 56391

(51) Int. Cl.
*H05B 37/02* (2006.01)
*B60Q 1/34* (2006.01)
*H05B 33/08* (2006.01)

(52) U.S. Cl.
CPC ............ *B60Q 1/343* (2013.01); *H05B 33/083* (2013.01); *H05B 33/0815* (2013.01); *H05B 33/0845* (2013.01); *H05B 37/0209* (2013.01); *H05B 37/0281* (2013.01)

(58) Field of Classification Search
CPC ............ H05B 33/0848; H05B 33/0803; H05B 33/086; H05B 33/0887; H05B 33/0893; H05B 33/0821; H05B 33/0824; H05B 33/0884; H05B 37/02; H05B 37/0209; H05B 41/39; H05B 33/0866; H05B 41/28; H05B 41/2828
USPC ... 315/291, 122, 307, 200 R, 312, 77, 209 R
See application file for complete search history.

(56) References Cited

U.S. PATENT DOCUMENTS

| 2007/0262724 A1* | 11/2007 | Mednik .............. H05B 33/0818 315/125 |
| 2009/0072728 A1* | 3/2009 | Moran-Mirabal ..... B82Y 20/00 313/504 |
| 2011/0199003 A1* | 8/2011 | Muguruma ........ H05B 33/0824 315/122 |

(Continued)

OTHER PUBLICATIONS

French Search Report dated Feb. 15, 2017 in European application 16 56391, filed on Jul. 5, 2016( with English Translation of categories cited).

*Primary Examiner* — Wei Chan
(74) *Attorney, Agent, or Firm* — Oblon, McClelland, Maier & Neustadt, L.L.P.

(57) ABSTRACT

A light-emitting device, especially for lighting and/or signaling for a motor vehicle, includes at least a first electroluminescent module and a second electroluminescent module energized in series. Each electroluminescent module includes, in parallel: a first branch having a light source having a first direct threshold voltage beyond which the light source is gated on, and a second branch having an element such that the voltage on the terminals of the element is less than the first direct threshold voltage of the light source. A third branch has a timing module able to time a predetermined period and modify, at the end of the predetermined period, an overall impedance of the second branch so that a voltage in the second branch is greater than the first direct threshold voltage of the light source. The predetermined period in the first electroluminescent module is less than that of the second electroluminescent module.

15 Claims, 3 Drawing Sheets

(56) References Cited

U.S. PATENT DOCUMENTS

| | | | |
|---|---|---|---|
| 2013/0162153 A1* | 6/2013 | van de Ven | H05B 33/083 |
| | | | 315/193 |
| 2014/0184076 A1* | 7/2014 | Murphy | H05B 33/0824 |
| | | | 315/121 |
| 2014/0246980 A1 | 9/2014 | Petsch | |
| 2016/0192447 A1* | 6/2016 | Kovatchev | H03K 17/063 |
| | | | 315/193 |
| 2016/0242249 A1* | 8/2016 | Hiramatsu | H05B 33/0824 |

* cited by examiner

LIGHTING AND/OR SIGNALING DEVICE WITH SCROLLING EFFECT

The invention deals with the field of lighting and/or signaling, especially for motor vehicles.

In particular, it finds applications in headlights, the car body or the passenger compartment of a motor vehicle.

The light sources used for lighting and signaling in motor vehicles are increasingly often composed of light-emitting diodes, especially for advantages of size and autonomy as compared to classical light sources. The use of light-emitting diodes in the lighting and/or signaling modules has furthermore allowed the market players (makers of automobiles and designers of lighting and/or signaling devices) to add a creative touch to the design of these devices, especially for the use of an ever larger number of these light-emitting diodes to achieve optical effects.

One of these optical effects consists in a progressive lighting up of a series of light-emitting diodes, so as to create a scrolling effect, also known as a "tracer light". Such an effect may be used to signal a change of direction, with or without blinking, or for the personalization of the lighting of the passenger compartment of a motor vehicle.

The known solutions for achieving such a scrolling effect consist in using a pilot or driver able to successively energize the light-emitting diodes performing the function, each light-emitting diode being connected to the driver by a dedicated power supply wire. Besides the power supply wire, a ground wire is also required.

By driver is meant a device for converting an electrical power supply coming from an electrical power supply network of the vehicle into an electrical power supply suitable for achieving the desired lighting function, and possibly to provide said electrical power supply adapted to a light source in order to achieve said desired light function.

However, in view of the large number of light-emitting diodes used for the achieving of such functions, the use of dedicated wires for each of these diodes is a very costly and cumbersome solution.

The present invention intends to ameliorate the situation.

One aspect of the invention concerns a light-emitting device, especially for lighting and/or signaling, especially for a motor vehicle, comprising:
at least a first electroluminescent module and a second electroluminescent module energized in series;
each electroluminescent module comprising, in parallel:
- a first branch comprising a light source having a first direct threshold voltage beyond which the light source is gated on;
- a second branch comprising an impedance having a value such that the voltage on the terminals of said impedance is less than the first direct threshold voltage of the light source when the electroluminescent module is energized;
- a third branch comprising a timing module able to time a predetermined period and modify, at the end of said predetermined period, an overall impedance of the second branch so that a voltage in the second branch is greater than the first direct threshold voltage of the light source.

The predetermined period in the first electroluminescent light module is less than the predetermined period in the second electroluminescent light module.

Thus, the present invention allows the realization of a scrolling function with at least two electroluminescent modules connected in series, which makes it possible to reduce the size, since a single power supply wire is needed.

According to one embodiment, the light source comprises at least one semiconductor emitting element, especially a light-emitting diode.

Semiconductor technologies enable a reduced footprint and a personalization of the light emitting device.

According to one embodiment, each of the light sources may comprise a plurality of electroluminescent units of submillimeter dimensions formed on a substrate.

In addition, each of the electroluminescent units may be a stick.

The use of an electroluminescent source with sticks of submillimeter dimensions makes it possible to place a driver energizing the modules just below the substrate, which reduces the footprint of the device according to the invention.

According to one embodiment, the second and third branches are connected to the substrate. The footprint of the device is thus reduced.

According to one embodiment, the light sources may be formed on the same substrate.

Such a solution makes it possible to reduce the production cost of a device according to the invention.

According to one variant, each of the light sources may comprise a light-emitting diode connected to a dedicated integrated circuit and the second and third branches of an electroluminescent module may be comprised in the integrated circuit or in an integrated circuit soldered beneath a substrate of the light-emitting diode.

The invention is thus compatible with sources of light-emitting diode type.

According to one embodiment of the invention, the first and second electroluminescent modules may be energized in cycles during power supply periods spaced apart by cut-out periods during which the first and second electroluminescent light modules are not energized, and the predetermined periods of the electroluminescent modules may all be less than one power supply period.

Thus, a scrolling effect with blinking can be realized.

In addition, the predetermined periods of the electroluminescent modules are all at least three times less than the power supply period.

Such an embodiment makes it possible to ensure that the lighting/signaling function is quite visible despite the scrolling effect.

According to one embodiment, the second branch may furthermore comprise a switch closed by default, and the timing module can modify the overall impedance of the second branch by opening the switch.

The opening of a switch makes it possible to ensure a sufficient voltage on the terminals of the second branch to make sure that the light source is gated on.

According to one embodiment, an output of the timing module of the first electroluminescent module can be connected to an input of the timing module of the second electroluminescent module, the timing modules can be able to apply respective timing periods, the predetermined period of the first electroluminescent module can be equal to the timing period of the timing module of the first electroluminescent module, and the predetermined period of the second electroluminescent module may be equal to the predetermined period of the first electroluminescent module plus the timing period of the timing module of the second electroluminescent module.

More generally, the predetermined period of an electroluminescent light module is equal to the timing period of its timing module plus the predetermined period of the preceding electroluminescent light module in the series arrangement.

Such an embodiment makes it possible to create a concatenation of timings of the electroluminescent modules, thus generating a cascade effect.

As a variant, an output of the timing module of the first electroluminescent light module may be connected to an input of the timing module of the second electroluminescent light module, the timing modules possibly being able to apply the same given timing period, the predetermined period of the first electroluminescent light module can be equal to the given timing period, and the predetermined period of the second electroluminescent light module can be equal to twice the given timing period.

More generally, the predetermined period of an electroluminescent light module is equal to the timing period plus the predetermined period of the preceding electroluminescent light module in the series arrangement.

Such an embodiment, in addition to the advantages of the preceding embodiment, makes it possible to use the same timing modules (the same timing period being applied), which allows a reduction in the costs of production of the lighting/signaling device according to the invention.

According to one embodiment, each timing module may comprise at least one capacitance, a first resistance and a comparator arranged such that when the electroluminescent modules are energized, a voltage on the terminals of the capacitance becomes larger than a threshold voltage of the comparator at the end of the predetermined period, and the comparator can be designed to modify the voltage in the second branch when the voltage on the terminals of the capacitance is greater than the threshold voltage of the comparator.

Thus, a simple electronic circuit allows the timing function to be realized.

In addition, and when the electroluminescent modules are energized in cycles, each timing module may further comprise a second resistance in parallel with the capacitance so as to discharge the capacitance during each cut-out period.

A blinking effect is thus made possible.

According to one embodiment, for each electroluminescent module the second branch may comprise:
a field effect transistor;
a NPN transistor;
a first impedance placed between an input of the electroluminescent module and a collector of the NPN transistor;
a second impedance placed between an output of the electroluminescent module and an emitter of the NPN transistor;
a third impedance placed between the input of the electroluminescent module and a base of the NPN transistor;
a fourth impedance placed between the output of the electroluminescent module and a gate of the field effect transistor;

A field effect transistor source may be connected to the output of the electroluminescent module, a drain of the field effect transistor may be connected to the gate of the NPN transistor, the output of the timing module may be connected to the gate of the field effect transistor such that:
during the predetermined period, the NPN transistor is able to let a current pass between the collector and the emitter, so that a total impedance of the second depend solely on the first, second and third impedances, the first, second and third impedances being such that the voltage in the second branch is less than the direct threshold voltage of the light source;
at the end of the predetermined period, the timing module is able to deliver a current to the gate of the field effect transistor, causing current to pass between the drain and the source of the field effect transistor and thus increasing an impedance of the NPN transistor and the overall impedance in the second branch, beyond the direct threshold voltage of the light source.

It is thus possible to increase the overall impedance of the second branch at less cost.

According to one embodiment, the device may further comprise a pilot able to energize the electroluminescent modules in series.

By pilot is meant a module of the driver type. Thus, a single pilot puts out a single power supply signal, which reduces the footprint and the costs as compared to the solutions of the prior art.

Other characteristics and advantages of the invention will appear upon scrutinizing the following detailed description, and the appended drawings, in which.

Figure 1:
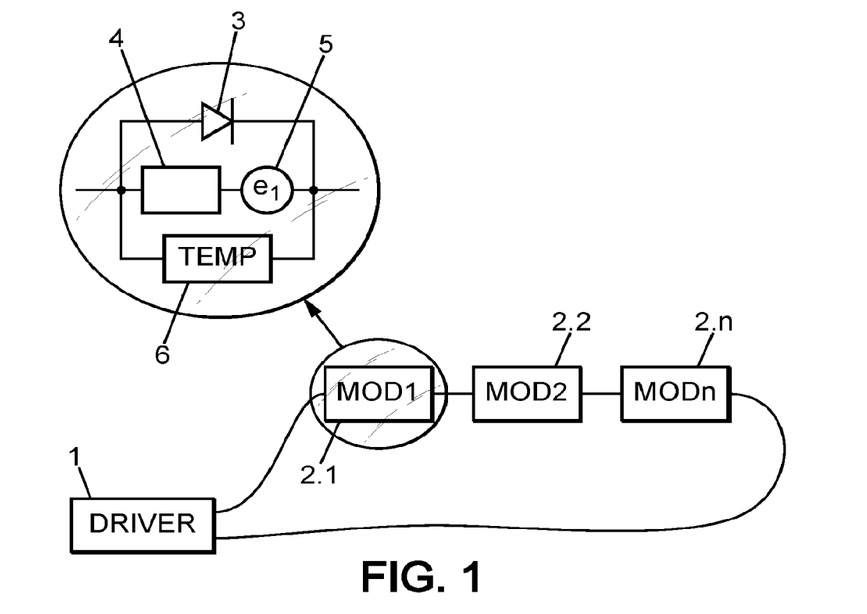
FIG. 1 illustrates a device according to one embodiment of the invention.

FIG. 1 illustrates a light emitting device, particularly for lighting and/or signaling, especially for a motor vehicle, comprising a driver or pilot 1 able to electrically energize a plurality of n electroluminescent modules 2.1, 2.2 ... 2.n in series, n being greater than or equal to two, comprising at least a first electroluminescent module 2.1 and a second electroluminescent module 2.2.

As described below, the modules 2.1 to 2.n are configured so as to light up in successive manner, one after the other, when they are energized by the pilot 1. The arrangement in space of the modules 2.1 to 2.n thus allows a realization of light functions with a scrolling effect, which can be utilized to indicate a change in direction of the motor vehicle, with or without a supplemental blinking effect.

A blinking effect may be obtained by energizing the modules 2.1 to 2.n in cycles, via the pilot 1, in power supply periods spaced apart by cut-out periods during which the electroluminescent modules 2.1 to 2.n are not energized.

According to the invention, each electroluminescent module comprises, in parallel:
a first branch comprising a light source 3 having a first direct threshold voltage beyond which the electroluminescent light source is gated on. The first direct threshold voltage may be, for example, equal to 3.5 V. The light source 3 may comprise at least one semiconductor emitting element;
a second branch comprising an element 5, such as a voltage source comprising at least one impedance of resistance type, for example, having a value such that the voltage on the terminals of the element is less than the first direct threshold voltage of the electroluminescent light source when the electroluminescent light module is energized. For example, the voltage on the terminals of the element 5 may be equal to 2 V when the electroluminescent module is energized; and a third branch comprising a timing module 6 able to time a predetermined period and modify (increase), at the end of the predetermined period, an overall impedance of the second branch so that a voltage in the second branch is greater than the threshold voltage of the light source. In order to modify the overall impedance of the second branch, the timing module 6 may for example open a switch 4 of the second branch, at the end of the predetermined period. A detailed example of an electronic circuit able to realize the function of the timing module 6 and the switch 4 shall be described below.

The electroluminescent modules 2.1, 2.2 and 2.n apply increasing predetermined periods so as to create a progressive light display effect (scrolling effect). For this purpose, the predetermined period in the first electroluminescent module 2.1 is less than the predetermined period in the second electroluminescent module 2.2, which is less than the predetermined period in the n-th electroluminescent module 2.n.

Thus, a scrolling effect is created by using a single power supply wire and a single ground wire, connected to the pilot 1, which reduces the footprint and the cost as compared to the solutions of the prior art.

Each light source 3 may comprise, in a first embodiment, a plurality of electroluminescent sticks of submillimeter dimensions formed on a substrate. Optionally, the second and third branches may then be connected to the substrate, for example, soldered beneath the substrate. In this case, the light sources 3 may be formed on the same substrate.

Figure 2:
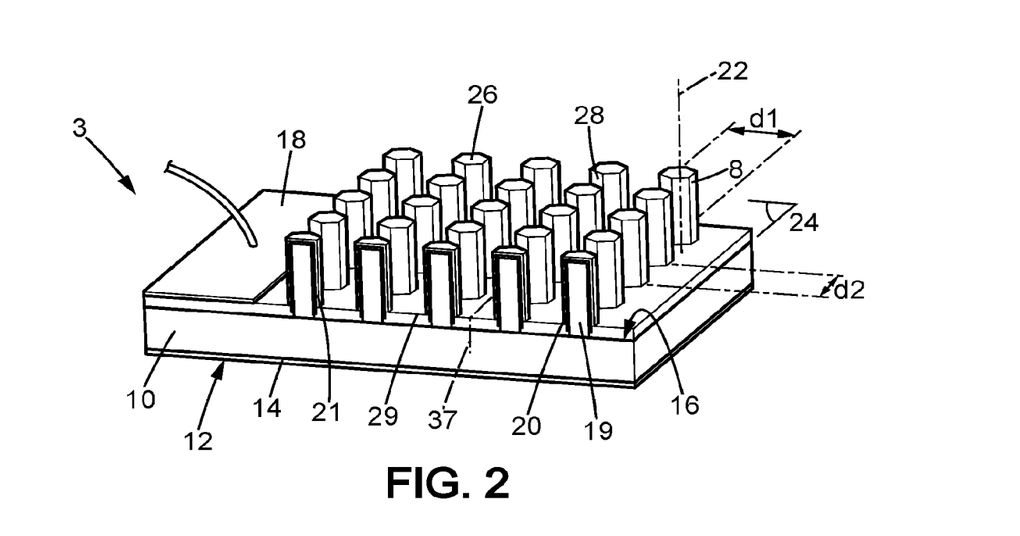
FIG. 2 is a schematic perspective representation of the light source of FIG. 1, according to one embodiment of the invention.
Figure 3:
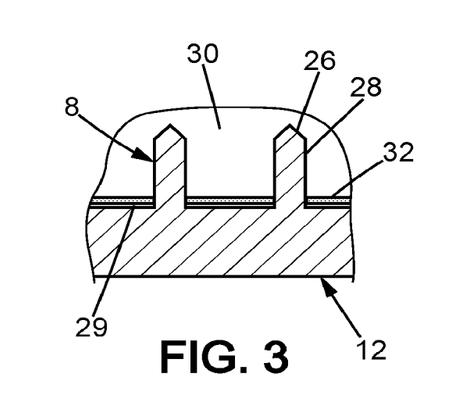
FIG. 3 is a cross section view of one particular embodiment of a light source according to the invention.

A light source 3 according to the first embodiment of the invention is described with regard to FIGS. 2 and 3.

Referring to FIG. 2, the light source 3 comprises a plurality of electroluminescent sticks 8 of submillimeter dimensions, which shall be termed hereafter electroluminescent sticks. These electroluminescent sticks 8 are created on the same substrate 10. Each electroluminescent stick, formed here by the use of gallium nitride (GaN), extends perpendicularly, or substantially perpendicularly, from the substrate, realized here on a silicon basis, other materials such as silicon carbide being able to be used for the substrate without leaving the scope of the invention. As an example, the electroluminescent sticks could be made from a compound based on aluminum nitride and gallium nitride (AlN:GaN), or from a compound based on aluminum, indium and gallium.

In FIG. 2, the substrate 10 has a lower face 12, on which is placed a first electrode 14, and an upper face 16, from which extend the electroluminescent sticks 8 and on which is placed a second electrode 18. The electrodes 14 and 18 are connected to the first branch.

Different layers of material are superposed on the upper face 16, especially after the growth of the electroluminescent sticks from the substrate, obtained here in an ascending manner.

Among these different layers there may be at least one layer of electrically conductive material, so as to enable the electrical power supply of the sticks. This layer is etched so as to connect the sticks of the light source 3 to each other.

The electroluminescent sticks of submillimeter dimensions extend from the substrate and each comprise, as can be seen in FIG. 2, a core 19 of gallium nitride, around which are disposed quantum wells 20 formed by a radial superpositioning of layers of different materials, here, gallium nitride and gallium-indium nitride, and a shell 21 surrounding the quantum wells, likewise made of gallium nitride.

Each stick extends along a longitudinal axis 22 defining its height, the base 23 of each stick being disposed in a plane 24 of the upper face 16 of the substrate 10.

The electroluminescent sticks 8 of the light source 3 advantageously have the same shape. These sticks are each bounded by a terminal face 26 and by a circumferential wall 28 which extends along the longitudinal axis. When the electroluminescent sticks are doped and subject to polarization, the resulting light leaving the light source 3 is emitted principally from the circumferential wall 28, it being understood that one may arrange for light rays to emerge likewise, at least in small quantity, from the terminal face 26. As a result, each stick acts like a single light-emitting diode and the density of the electroluminescent sticks 8 improves the luminance of the light source 3.

The circumferential wall 28 of a stick 8, corresponding to the shell of gallium nitride, is covered by a layer of transparent conductor oxide (TCO) 29 which forms the anode of each stick, complementary to the cathode formed by the substrate.

This circumferential wall 28 extends along the longitudinal axis 22 from the substrate 10 to the terminal face 26, the distance of the terminal face 26 from the upper face 16 of the substrate, from which the electroluminescent sticks 8 are created, defining the height of each stick. As an example, one can have the height of an electroluminescent stick 8 between 1 and 10 micrometers, while one can have the largest transverse dimension of the terminal face, perpendicular to the longitudinal axis 22 of the particular electroluminescent stick, less than 2 micrometers. One may also define the surface of a stick, in a cross sectional plane perpendicular to this longitudinal axis 22, in a range of particular values, especially between 1.96 and 4 square micrometers.

These dimensions, given as a nonlimiting example, make it possible to demarcate a light source comprising electroluminescent sticks of a light source with planar light-emitting diodes. However, as explained below, a second embodiment of the invention calls for the use of light sources with light-emitting diodes.

One could also have other particular dimensionings of the light source according to the invention, and in particular a dimension of the illuminating surface of, for example, at most 8 $mm^2$. The density of the sticks and the area of the illuminating surface can be calculated in particular so that the luminance obtained by the plurality of electroluminescent sticks is, for example, at least 60 $Cd/mm^2$. However, as a variant, one may use any adapted dimension and illuminating surface, including an illuminating surface for example larger than 8 $mm^2$. The optimal dimension of the illuminating surface of the source will depend on the lens focus, its front surface and the intended function.

It will be understood that, when forming the sticks 8, the height may be modified from one light source to another, so as to increase the luminance of the light source when the height is increased. The height of the sticks may likewise be modified within a single light source 3, so that a group of sticks may have a different height than another group of sticks of another light source 3.

The shape of the electroluminescent sticks 8 may likewise vary from one light source 3 to another, especially regarding the cross section of the sticks and the shape of the terminal face 26. There are illustrated in FIG. 2 electroluminescent sticks having a general cylindrical shape, and in particular a polygonal cross section, more particularly a hexagonal one here. It will be understood that what is important is that the light can be emitted across the circumferential wall, whether it has a polygonal or a circular shape, for example.

Moreover, the terminal face 26 may have a substantially planar shape and be perpendicular to the circumferential wall, so that it extends substantially parallel to the upper face 16 of the substrate 10, as is illustrated in FIG. 2, or so that it has a convex shape or a shape which is pointed at its center, so as to multiply the directions of emission of the light emerging from this terminal face, such as is illustrated in FIG. 3.

In FIG. 2, the electroluminescent sticks 8 are arranged in a matrix of two dimensions. This arrangement could be such that the electroluminescent sticks are arranged staggered. The invention covers other distributions of the sticks, in particular with densities of sticks which may vary from one light source to another, and which may vary according to different zones of the same light source 3. FIG. 2 represents the distance d1 separating two immediately adjacent electroluminescent sticks in a first transverse direction and the distance d2 separating two immediately adjacent electroluminescent sticks in a second transverse direction.

The separation distances d1 and d2 are measured between two longitudinal axes 20 of adjacent electroluminescent sticks. The number of electroluminescent sticks 8 projecting from the substrate 10 may vary from one device to another, especially in order to increase the luminous density of the light source, yet it is stipulated that one or the other of the separation distances d1, d2 should be at least equal to 10 micrometers, so that the light emitted by the circumferential wall 28 of each electroluminescent stick 8 can emerge from the matrix of sticks.

The electroluminescent light source 3 may furthermore comprise, as illustrated in FIG. 3, a layer 30 of a polymer material in which electroluminescent sticks 8 are at least partly embedded. The layer 30 may thus extend for the entire extension of the substrate or only around a particular group of electroluminescent sticks 8. The polymer material, which may be based on silicone in particular, makes it possible to protect the electroluminescent sticks 8 without disturbing the diffusion of the light rays. Furthermore, it is possible to integrate in this layer 30 of polymer material means of wavelength conversion, and for example luminophores, able to absorb at least some of the rays emitted by one of the sticks and to convert at least a portion of this absorbed excitation light into an emission light having a wavelength different from that of the excitation light.

The electroluminescent light sources 3 may furthermore have a coating 32 of light reflecting material which is disposed between the electroluminescent sticks 8 to deviate the rays, initially oriented toward the substrate, to the terminal face 26 of the electroluminescent sticks 8. In other words, the upper face 16 of the substrate 10 may have a reflective means which sends the light rays initially oriented toward the upper face 16 to the exit face of the light source 3. One thus recuperates rays which would otherwise have been lost. This coating 32 is disposed between the electroluminescent sticks 8 on the layer of transparent conductor oxide 29.

This first embodiment is particularly advantageous in that the second and third branches illustrated in FIG. 1 can be connected directly to the substrate. Moreover, the same substrate can be used for at least two electroluminescent light sources 3.

According to a second embodiment, the light sources 3 may be light-emitting diodes each comprising a miniaturized printed circuit (PCB) in which the second and third branches illustrated in FIG. 1 are integrated. The first and second branches can likewise be comprised in an integrated circuit soldered beneath the silicon substrate.

Figure 4:
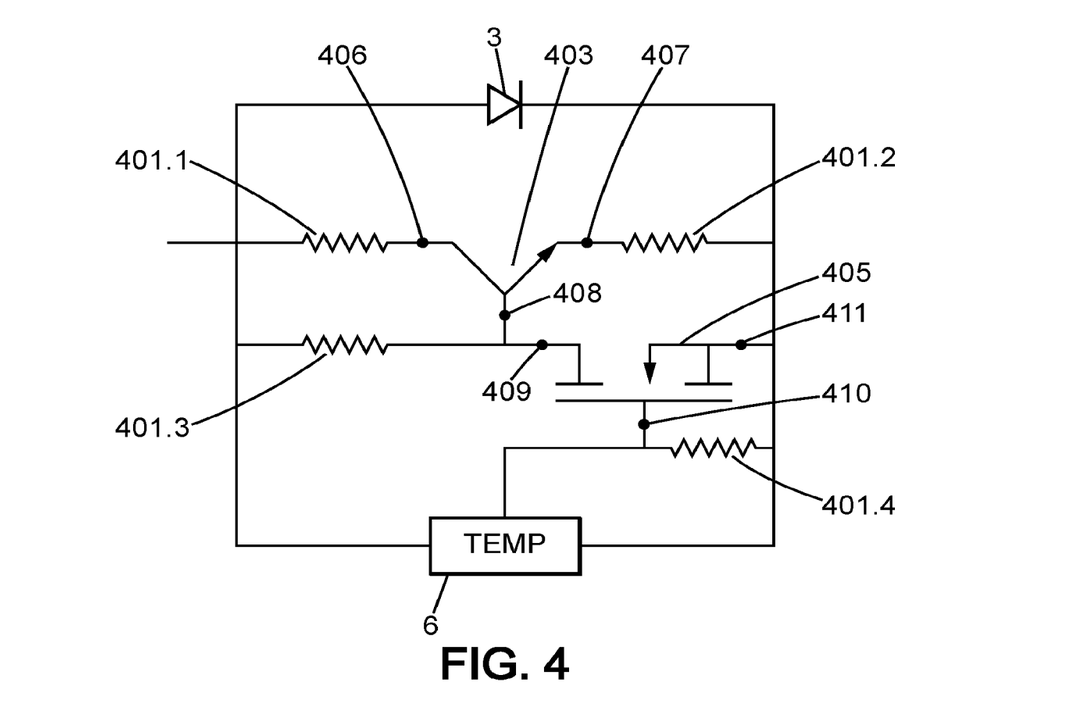
FIG. 4 presents a detailed diagram of a second branch of an electroluminescent module according to one embodiment of the invention.

FIG. 4 illustrates a detailed embodiment of the second branch of an electroluminescent module according to one embodiment of the invention.

The first branch comprising the light source 3 and the third branch comprising the timing module 6 are likewise illustrated in FIG. 4.

The second branch comprises a NPN transistor 403, a field effect transistor of MOSFET type 405 and four impedances 401.1 to 401.4, which may be resistances, for example A first impedance 401.1 is placed between the input of the electroluminescent light module and the collector 406 of the NPN transistor 403. A second impedance 401.2 is placed between the output of the electroluminescent module and the emitter 407 of the NPN transistor 403. A third impedance 401.3 is placed between the input of the electroluminescent module and the base 408 of the NPN transistor 403. A fourth impedance 401.4 is placed between the output of the electroluminescent module and the gate 410 of the MOSFET 405.

The source 411 of the MOSFET 405 is connected to the output of the electroluminescent module and the drain 409 of the MOSFET 405 is connected to the gate 408 of the NPN transistor 403.

The output of the timing module 6 is connected to the gate of the MOSFET 405. The timing module 6 is configured to not send any signal for a predetermined period after the start of a power supply period of the driver 1 illustrated in FIG. 1, and to send a signal at the end of the predetermined period and this until at least the end of the power supply period of the driver 1.

By default, when the gate 410 of the MOSFET 405 is not energized by the timing module 6, no current flows between the drain 409 and the source 405 and the current at the output of the third impedance 401.3 thus goes to the base 408 of the NPN transistor. Hence, current flows between the collector 406 and the emitter 407 and the impedance (the element or source of voltage 5 illustrated in FIG. 1) of the second branch thus depends solely on the three impedances 401.1, 401.2 and 401.3, which may be resistances forming a voltage source. The three impedances 401.1, 401.2 and 401.3 are chosen such that the voltage in the second branch, and thus in the first branch comprising the light source 3, is less than the first direct threshold voltage of the light source 3. For example, if the threshold voltage is 3.5 V, the three impedances 401.1, 401.2 and 401.3 can be chosen such that the voltage on the terminals of the second branch is 2 V, during the predetermined period, when the electroluminescent module is energized by the driver 1 (power supply period).

At the end of the predetermined period, the timing module furnishes a signal to the gate 410 of the MOSFET 405, which causes current to flow between the drain 409 and the source 411. Since less current is received at the base 408, the impedance of the NPN transistor 403 increases, thus increasing also the overall impedance in the second branch, with the NPN transistor 403 thus acting as an open switch.

The voltage on the terminals of the second branch thus exceeds the first direct threshold voltage of the electroluminescent light source 3, which thus becomes gated on, and remains gated on until the end of the power supply period of the driver 1.

Thus, by applying increasing predetermined periods in the different timing modules 6 of the electroluminescent modules 2.1 to 2.n, a light scrolling effect can be created by using a single power supply wire.

It should be noted that the embodiment of the second branch illustrated in FIG. 4 is given solely as an illustration, and the invention will not be limited to this embodiment. In fact, the invention covers any branch having an impedance and a controllable means of modifying the overall impedance in the second branch, the controllable means being controlled by an output of the timing unit 6.

Figure 5:
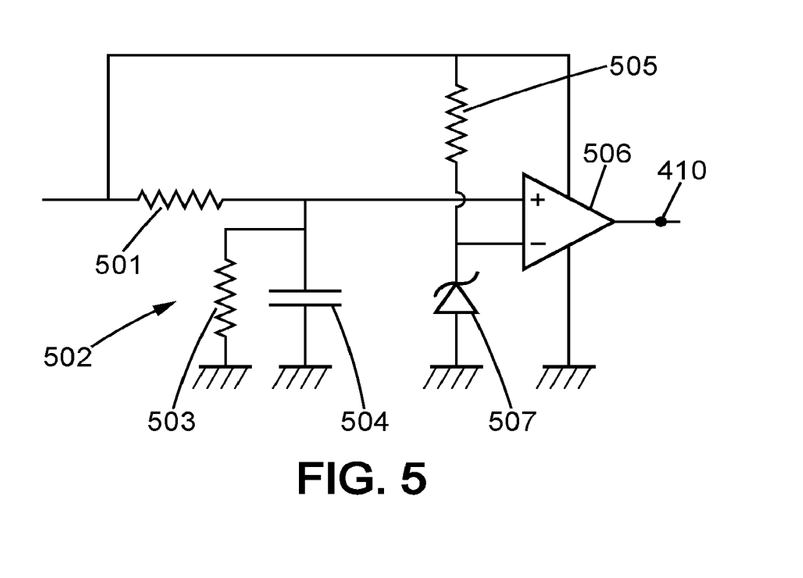
FIG. 5 is a detailed diagram of a timing module according to one embodiment of the invention.

FIG. 5 presents a detailed diagram of a timing unit 6 according to one embodiment of the invention.

The timing module 6 comprises a first impedance 501 (of resistance type, for example) connected to the input of the electroluminescent module on the one hand and to an input of a RC circuit 502 on the other hand, the RC circuit comprising a capacitance 504 and a second impedance 503 (of resistance type, for example) in parallel.

The input of the RC circuit is furthermore connected to a positive input of a comparator 506 energized directly by the driver 1.

A third impedance 505 is placed between the input of the electroluminescent light module on the one hand and the negative input of the comparator 506 on the other hand The negative input of the comparator 506 is furthermore connected to a Zener diode 507 making it possible to set the voltage at the negative input of the comparator 506.

The output of the comparator 506 is connected to the gate 410 of the MOSFET 405 of FIG. 4 (or more generally controls the switch 4 of FIG. 1).

When the electroluminescent module is energized, the capacitor 504 is charged until the voltage on the terminals of the capacitor 504 reaches the voltage imposed by the Zener diode 507 at the end of the predetermined period. At the end of the predetermined period, a signal is thus sent by the comparator, modifying the value of the overall impedance in the second branch so that the electroluminescent light source 3 is gated on.

This predetermined period depends in particular on the first impedance 501.

Thus, by outfitting each of the electroluminescent modules with first impedances 501 of different values, one obtains different predetermined periods, making it possible to achieve the intended scrolling effect.

It should be noted that upon expiration of the power supply period, the capacitance 504 discharges into the branch of the second impedance 503, and the same scrolling effect may be recreated when a new power supply period begins, thus making possible a supplemental blinking effect.

Figure 6:
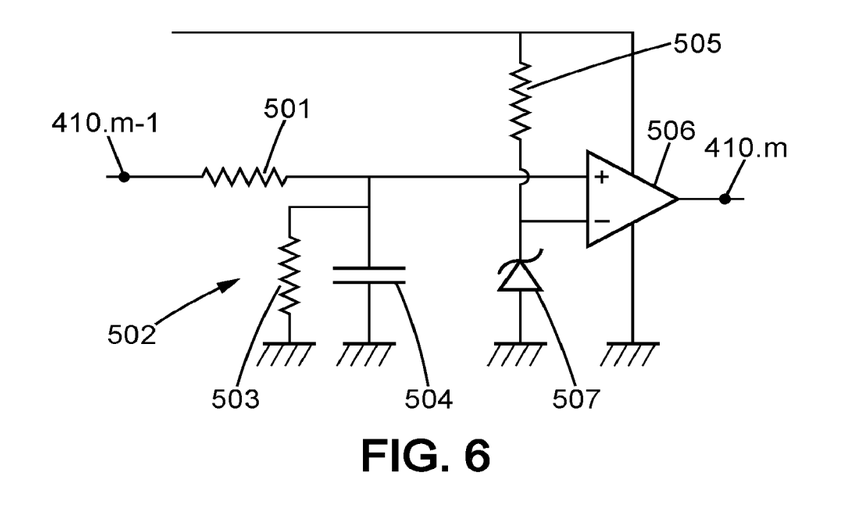
FIG. 6 is a detailed diagram of a timing module according to a variant embodiment of the invention.

FIG. 6 presents a detailed diagram of a timing unit 6 of an electroluminescent light module of index m according to one variant of the invention.

The timing unit 6 comprises the same components referenced in the same way as in FIG. 5.

The difference from the embodiment of FIG. 5 lies in the fact that the RC circuit 502 is energized by the output 410.*n*-1 of the comparator 506 of the preceding electroluminescent module, of index m-1.

Thus, the capacitance 504 of the electroluminescent module 2.*m* begins to charge when the comparator 506 of the electroluminescent light module 2.*m*-1 emits an output signal. It is thus possible to have first impedances 501 which are identical in all the electroluminescent modules, which facilitates the production of such modules and which consequently reduces their cost, as compared to the solution of FIG. 5. Thus, each timing unit 6 applies the same timing period (corresponding to the time needed by the capacitance 504 for the voltage on its terminals to reach the level imposed by the Zener diode 507). The predetermined period of the electroluminescent light module 2.*m* is thus equal to the sum of the timing period and the predetermined period of the electroluminescent light module 2.*m*-1.

As a variant, the electroluminescent modules have respective impedances 501 of different values. Each timing unit 6 thus applies its own timing period. The predetermined period of the electroluminescent light module 2.*m* is thus equal to the sum of the timing period of its timing module and the predetermined period of the electroluminescent light module 2.*m*-1.

In the above example, m varies between 2 and n. Of course, for the electroluminescent module 2.1, the RC circuit is directly energized by the driver 1, since this is the first module.

Advantageously, whether for the embodiment of FIG. 5 or for the variant of FIG. 6, one may have all the predetermined periods shorter (and preferably three times shorter) than the power supply period. For example, the longest predetermined period (that of the electroluminescent module 2.n) is equal to 100 ms, the power supply period is equal to 500 ms and the cut-out period is equal to 500 ms.

Of course, the invention is not limited to the embodiments described above and furnished solely as an example It encompasses various modifications, alternative embodiments and other variants which may be contemplated by the skilled person in the context of the present invention and in particular all combinations of the different embodiments described above.

The invention claimed is:

1. A light-emitting device for at least one of lighting or signaling for a motor vehicle, comprising:
    at least a first electroluminescent module and a second electroluminescent module energized in series;
    each of the first and the second electroluminescent modules comprising:
        a first branch comprising a light source having a first direct threshold voltage beyond which the light source is turned on;
        a second branch in parallel with the first branch and comprising at least a switch and a non-illuminating element including terminals with a voltage that is less than the first direct threshold voltage of the light source;
        a third branch in parallel with the first and second branches and comprising a timing module configured to time a predetermined period and modify, at the end of said predetermined period, an overall impedance of the second branch so that a voltage in the second branch is greater than or equal to said first direct threshold voltage of the light source,
    wherein the predetermined period in the first electroluminescent module is less than the predetermined period in the second electroluminescent module, and
    an output of the timing module of the first electroluminescent module is connected to an input of the timing module of the second electroluminescent module, the timing modules are configured to apply respective timing periods, the predetermined period of the first electroluminescent module is equal to the timing period of the timing module of the first electroluminescent module, and the predetermined period of the second electroluminescent module is equal to the predetermined period of the first electroluminescent module plus the timing period of the timing module of the second electroluminescent module.

2. The light-emitting device according to claim 1, wherein each light source comprises at least one semiconductor emitting element.

3. The light-emitting device according to claim 2, wherein each light source comprises a plurality of electroluminescent units of submillimeter dimensions formed on a substrate.

4. The light-emitting device according to claim 3, wherein the second and third branches are connected to said substrate.

5. The light-emitting device according to claim 3, wherein the light sources are formed on the same substrate.

6. The light-emitting device according to claim 2, wherein each light source comprises a light-emitting diode connected to a dedicated integrated circuit, and the second and third branches of a respective one of the first and second electroluminescent modules are comprised in the integrated circuit or in an integrated circuit soldered beneath a substrate of the light-emitting diode.

7. The light-emitting device according to claim 1, wherein the first and second electroluminescent modules are energized in cycles during power supply periods spaced apart by cut-out periods, and wherein the predetermined periods of the light modules are all less than one power supply period.

8. The light-emitting device according to claim 7, wherein the predetermined periods of the first and second electroluminescent modules are all at least three times less than the power supply period.

9. The light-emitting device according to claim 1, wherein the second branch furthermore comprises a switch closed by default, and the timing module is configured to modify the overall impedance of the second branch by opening said switch.

10. The light-emitting device according to claim 1, wherein an output of the timing module of the first electroluminescent module is connected to an input of the timing module of the second electroluminescent module, the timing modules are configured to apply the same given timing period, the predetermined period of the first electroluminescent module is equal to the given timing period, and the predetermined period of the second electroluminescent module is equal to twice the given timing period.

11. The light-emitting device according to claim 7, wherein each timing module comprises at least one capacitor, a first resistor and a comparator arranged such that when the electroluminescent modules are energized, a voltage on the terminals of the capacitor becomes larger than a threshold voltage of the comparator at the end of the predetermined period, and the comparator is configured to modify the voltage in the second branch when the voltage on the terminals of the capacitor is greater than the threshold voltage of the comparator.

12. The light-emitting device according to claim 11, wherein each timing module further comprises a second resistor in parallel with the capacitor to discharge the capacitor during each cut-out period.

13. The light-emitting device according to claim 1, wherein for each electroluminescent module the second branch comprises:
a field effect transistor;
a NPN transistor;
a first impedance placed between an input of the electroluminescent module and a collector of the NPN transistor;
a second impedance placed between an output of the electroluminescent module and an emitter of the NPN transistor;
a third impedance placed between the input of the electroluminescent module and a base of the NPN transistor;
a fourth impedance placed between the output of the electroluminescent module and a gate of the field effect transistor;
wherein a source of the field effect transistor is connected to the output of the electroluminescent module, wherein a drain of the field effect transistor is connected to the gate of the NPN transistor, wherein the output of the timing module is connected to the gate of the field effect transistor such that:
during the predetermined period, the NPN transistor lets a current pass between the collector and the emitter, so that a total impedance of the second depend solely on the first, second and third impedances, the first, second and third impedances being such that the voltage in the second branch is less than the direct threshold voltage of the light source; and
at the end of the predetermined period, the timing module delivers a current to the gate of the field effect transistor, causing current to pass between the drain and the source of the field effect transistor and thus increasing an impedance of the NPN transistor and the overall impedance in the second branch, beyond the direct threshold voltage of the light source.

14. The light-emitting device according to claim 1, further comprising a pilot configured to energize the electroluminescent modules in series.

15. The light-emitting device according to claim 4, wherein the light sources are formed on the same substrate.

* * * * *